US012190404B2

(12) United States Patent
Wu et al.

(10) Patent No.: US 12,190,404 B2
(45) Date of Patent: *Jan. 7, 2025

(54) EXECUTING COMPUTATIONAL GRAPHS ON GRAPHICS PROCESSING UNITS (71) Applicant: Google LLC, Mountain View, CA (US)

(72) Inventors: Jingyue Wu, Newark, CA (US); Christopher Daniel Leary, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 1341 days.

This patent is subject to a terminal disclaimer.

(21) Appl. No.: 16/433,819

(22) Filed: Jun. 6, 2019

(65) Prior Publication Data
US 2019/0287210 A1 Sep. 19, 2019

Related U.S. Application Data (63) Continuation of application No. 15/400,937, filed on Jan. 6, 2017, now Pat. No. 10,325,340.

(51) Int. Cl.
G06N 3/063 (2023.01)
G06F 9/50 (2006.01)
(Continued)

(52) U.S. Cl.
CPC .............. *G06T 1/20* (2013.01); *G06F 9/5038* (2013.01); *G06F 16/9024* (2019.01);
(Continued)

(58) Field of Classification Search
CPC . G06F 8/34; G06F 8/38; G06F 21/125; G06F 3/0489; G06F 8/41; G06F 8/4432;
(Continued)

(56) References Cited

U.S. PATENT DOCUMENTS 4,309,756 A 1/1982 Beckler
5,844,554 A 12/1998 Geller et al.
(Continued)

FOREIGN PATENT DOCUMENTS

CN 101894051 11/2010
CN 103970670 8/2014
(Continued)

OTHER PUBLICATIONS

CN Office Action in Chinese Application No. 201810015495.3, dated Mar. 2, 2021, 39 pages (with English translation).
(Continued)

Primary Examiner — Luis A Sitiriche
(74) Attorney, Agent, or Firm — Fish & Richardson P.C.

(57) ABSTRACT

Methods, systems, and apparatus, including computer programs encoded on a computer storage medium, for generating a data entity that causes a processing unit to process a computational graph. In one aspect, a method includes the actions of receiving data identifying a computational graph, the computational graph including a plurality of nodes representing operations; obtaining compilation artifacts for processing the computational graph on a processing unit; and generating a data entity from the compilation artifacts, wherein the data entity, when invoked, causes the processing unit to process the computational graph by executing the operations represented by the plurality of nodes.

20 Claims, 5 Drawing Sheets (51) Int. Cl.
*G06F 16/901* (2019.01)
*G06N 3/084* (2023.01)
*G06N 3/10* (2006.01)
*G06T 1/20* (2006.01)

(52) U.S. Cl.
CPC .............. *G06N 3/063* (2013.01); *G06N 3/105* (2013.01); *G06N 3/084* (2013.01)

(58) Field of Classification Search
CPC .... G06F 8/71; G06F 9/30083; G06F 9/30145; G06F 9/30156; G06F 9/30167; G06F 9/30181; G06F 9/443; G06F 9/45516; B41B 3/00; B63B 23/58; E21B 10/43; E21B 10/485; E21B 29/06; Y02B 60/181; Y10S 715/962; Y10S 715/967
See application file for complete search history.

(56) References Cited

U.S. PATENT DOCUMENTS

| | | |
|---|---|---|
| 6,311,265 B1 | 10/2001 | Beckerle et al. |
| 6,519,767 B1 | 2/2003 | Carter et al. |
| 7,954,094 B2 | 5/2011 | Cascaval et al. |
| 2001/0023405 A1 | 9/2001 | Nagisa |
| 2005/0108507 A1 | 5/2005 | Chheda et al. |
| 2005/0114850 A1 | 5/2005 | Chheda et al. |
| 2006/0095722 A1 | 5/2006 | Biles et al. |
| 2008/0276252 A1 | 11/2008 | Pronovost et al. |
| 2013/0160016 A1* | 6/2013 | Gummaraju .......... G06F 9/5044 718/102 |
| 2014/0282180 A1 | 9/2014 | Orofino |
| 2014/0380291 A1 | 12/2014 | Auerbach et al. |
| 2015/0007182 A1 | 1/2015 | Rossback et al. |
| 2015/0067088 A1 | 3/2015 | Guerin et al. |
| 2015/0363294 A1 | 12/2015 | Carback, III et al. |
| 2016/0062800 A1 | 3/2016 | Stanfill et al. |
| 2018/0197267 A1 | 7/2018 | Wu et al. |

FOREIGN PATENT DOCUMENTS

| | | |
|---|---|---|
| CN | 104915187 | 9/2015 |
| CN | 105701506 | 6/2016 |
| CN | 106055576 | 10/2016 |
| WO | WO 2013040667 | 3/2013 |

OTHER PUBLICATIONS

Minervini et al, "Scalable Learning of Entity and Predicate Embeddings for Knowledge Graph Completion" IEEE, 2015, 6 pages.
CN Notice of Allowance in Chinese Application No. 201810015495.3, dated Nov. 3, 2021, 6 page (with English translation).
Abadi et al. "TensorFlow: A System for Large-Scale Machine Learning," Proceedings of the 12*th* USENIX Symposium on Operating Systems Design and Implementation, Nov. 2016, 20 pages.
Abadi et al. TensorFlow: Large-Scale Machine Learning on Heterogeneous Distributed Systems, [paper] Nov. 2015, 19 pages.
International Search Report and Written Opinion issued in International Application No. PCT/US2018/012650, mailed on May 4, 2018, 15 pages.
SG Office Action issued in Singaporean application No. 10201800154R, mailed on Jul. 17, 2018, 8 pages.

* cited by examiner

```
┌─────────────────────────────────────────────────────────────────────────┐
│                                                                         │
│   Based on the data entity, identify streams from the computational graph │
│                                                                    402  │
└─────────────────────────────────────────────────────────────────────────┘
                                    │
                                    ▼
┌─────────────────────────────────────────────────────────────────────────┐
│ For each stream, enqueue the respective group of operations into the stream that │
│           is associated with the respective group of operations         │
│                                                                    404  │
└─────────────────────────────────────────────────────────────────────────┘
                                    │
                                    ▼
┌─────────────────────────────────────────────────────────────────────────┐
│  Based on the data entity, define dependencies between the plurality of groups of │
│                               operations                                │
│                                                                    406  │
└─────────────────────────────────────────────────────────────────────────┘
```

FIG. 4

EXECUTING COMPUTATIONAL GRAPHS ON GRAPHICS PROCESSING UNITS

CROSS-REFERENCE TO RELATED APPLICATIONS

This application is a continuation of, and claims priority to, U.S. patent application Ser. No. 15/400,937, for "EXECUTING COMPUTATIONAL GRAPHS ON GRAPHICS PROCESSING UNITS," filed on Jan. 6, 2017. The disclosure of the foregoing application is incorporated here by reference.

BACKGROUND

This specification relates to processing computational graphs representing neural networks.

Neural networks are machine learning models that employ one or more layers of models to generate an output, e.g., one or more classifications, for a received input. Some neural networks include one or more hidden layers in addition to an output layer. The output of each hidden layer is used as input to the next layer in the network, i.e., the next hidden layer or the output layer of the network. Each layer of the network generates an output from a received input in accordance with current values of a respective set of parameters for the layer.

SUMMARY

This specification generally describes a system implemented as computer programs on one or more computers in one or more locations that generates a data entity. When the data entity is invoked, the data entity causes a graphic processing unit (GPU) to process a computational graph by executing operations associated with the computational graph.

In general, one innovative aspect of the subject matter described in this specification can be embodied in a method of operations comprising: receiving data identifying a computational graph, the computational graph including a plurality of nodes representing operations; obtaining compilation artifacts for processing the computational graph on a processing unit; and generating a data entity from the compilation artifacts, wherein the data entity, when invoked, causes the processing unit to process the computational graph by executing the operations represented by the plurality of nodes.

The foregoing and other embodiments can each optionally include one or more of the following features, alone or in combination. In particular, one embodiment includes all the following features in combination. The compilation artifacts further include: buffer data representing a plurality of buffer parameters and associations between the plurality of buffer parameters and the operations, each of the plurality of buffer parameters being associated with a respective operation of the operations. The compilation artifacts further include: respective logical numbers assigned to the plurality of buffer parameters, and data specifying associations between the logical numbers and the operations represented by the plurality of nodes. The compilation artifacts further include: a data structure representing (i) a sequence of operations and (ii) dependencies between the operations. The data structure is a Directed Acyclic Graph (DAG). The method further includes maintaining a plurality of libraries, each of the plurality of libraries storing one or more sub-routines. The compilation artifacts further include: library data representing a plurality of buffer parameters and associations between the plurality of buffer parameters and the plurality of libraries, each of the plurality of buffer parameters being associated with a respective library of the plurality of libraries. The compilation artifacts further include: machine code that is configured to process the computational graph. The operations are operations for processing an input of a neural network through one or more layers of the neural network to generate an output of the neural network. The operations are operations for training a neural network by adjusting values of parameters of the neural network. The processing unit is a GPU or a central processing unit (CPU).

In general, another innovative aspect of the subject matter described in this specification can be embodied in a method of operations comprising: receiving input buffer parameters that are user-specific inputs to a computational graph, the computational graph including a plurality of nodes representing operations; receiving a data entity including buffer data representing (i) a plurality of buffer parameters including the input buffer parameters and (ii) associations between the plurality of buffer parameters and the operations; and invoking the data entity with the input buffer parameters to cause a processing unit to process the computational graph in accordance with the input buffer parameters by executing the operations.

The foregoing and other embodiments can each optionally include one or more of the following features, alone or in combination. In particular, one embodiment includes all the following features in combination. The invoking the data entity with the input buffer parameters includes: based on the data entity, identifying one or more operations from the computational graph, the one or more operations corresponding to the input buffer parameters, and enqueuing the one or more operations on the processing unit to process the computational graph. The operations include a plurality of groups of operations and the data entity includes a data structure representing (i) a plurality of streams, each stream representing a sequence of operations and (ii) dependencies between the operations, and wherein invoking the data entity with the input buffer parameters comprising: based on the data entity, identifying a plurality of streams from the computational graph, each stream being associated with a respective group of operations from the operations, for each stream of the plurality of streams, enqueuing the respective group of operations into the stream that is associated with the respective group of operations, and based on the data entity, defining dependencies between the plurality of groups of operations. The processing unit is a GPU or a CPU.

The subject matter described in this specification can be implemented in particular embodiments so as to realize one or more of the following advantages. A conventional compiling system requires a host CPU to process operations. In the conventional compiling system, a GPU is idle while the host CPU is processing some operations. Thus, the conventional compiling system inefficiently uses the hardware resources of the GPU. Unlike the conventional compiling system, the system described in this specification generates a data entity that includes all necessary descriptions for executing operations. In particular, the data entity is generated at compilation time, and then the data entity can be invoked at run time to cause the GPU to process the computational graph. This allows all of the operations represented by the computational graph to be enqueued on the GPU as a whole, thus improves the efficiency of the machine including a GPU.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification generally describes a computational graph system that generates a data entity that, when invoked, causes a graphics processing unit (GPU) to process a computational graph by executing operations represented by the computational graph. In particular, when the data entity is invoked with input buffer parameters, the data entity is enqueued into a GPU as a whole and the GPU processes the computational graph in accordance with the input buffer parameters.

Figure 1A:
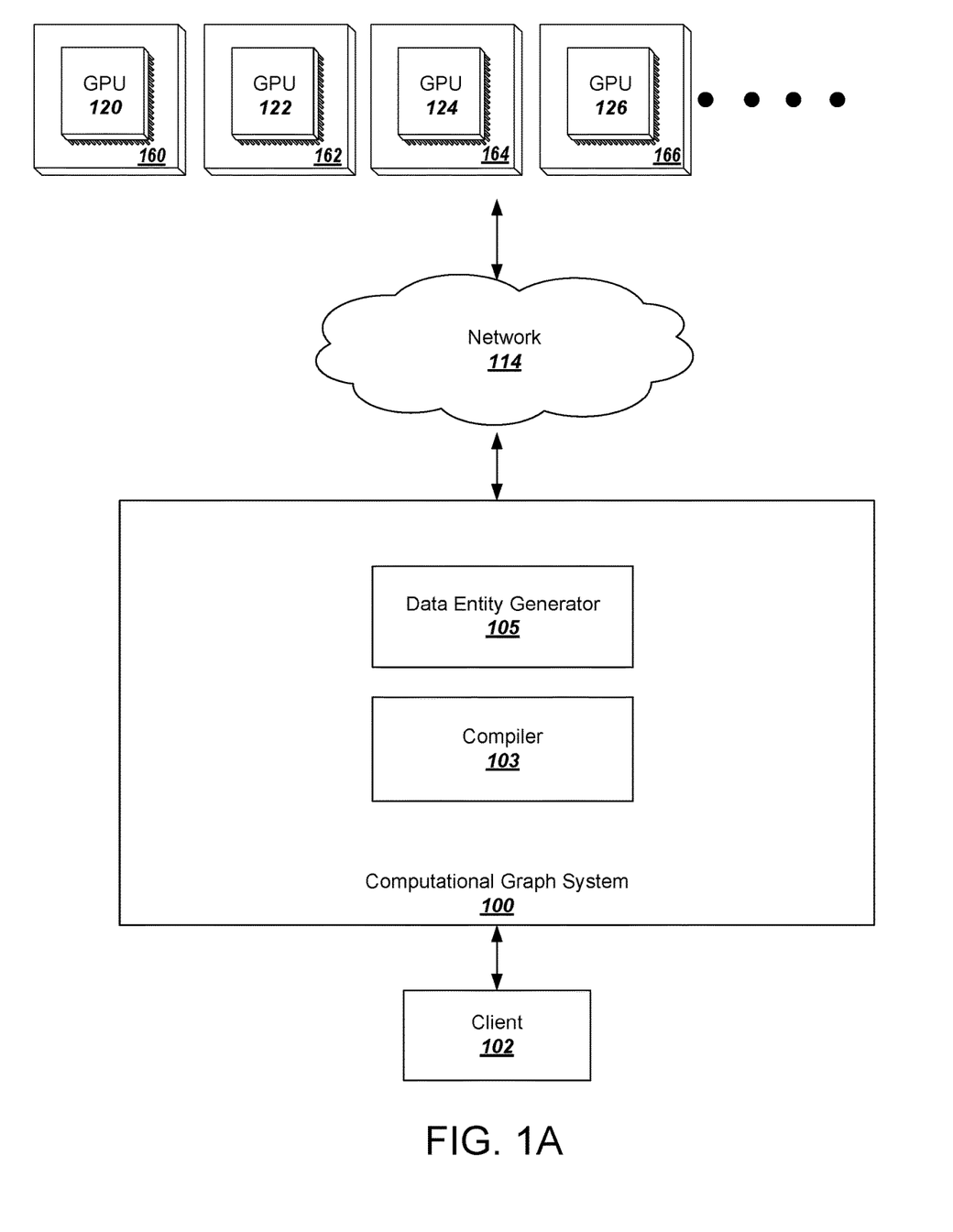
FIG. 1A illustrates an example computational graph system for generating a data entity from a computational graph.

FIG. 1A illustrates an example computational graph system 100 for generating a data entity from a computational graph. The computational graph system 100 is an example of a system implemented as computer programs on one or more computers in one or more locations, in which the systems, components, and techniques described below can be implemented.

A user of a client 102 can request operations be performed on a computational graph representing a neural network. The client 102 can be an application running on a computer. As part of the request, the client 102 provides data identifying a computational graph to the computational graph system 100 and specifies types of operations to be performed on the computational graph. For example, the request can identify a computational graph representing an inference for a particular neural network and can identify an input on which the inference should be performed. As another example, the request can identify a computational graph representing a neural network to be trained and an input, such as training data, on which the training should be performed.

The computational graph system 100 receives data including a computational graph as input. The computational graph represents computations of a machine learning model with nodes representing operations. In particular, a computational graph expresses computations, e.g. of a machine learning model, with nodes representing operations and directed edges representing data dependencies between operations. An incoming edge to a node represents a flow of an input into the node, i.e., an input argument to the operation represented by the node. If all arguments required for an operation are available to the operation node, the node is enabled and can be executed.

An outgoing edge from a node represents a flow of an output of the operation represented by the node to be used as an input to an operation represented by another node. Thus, a directed edge connecting a first node in the graph to a second node in the graph indicates that an output generated by the operation represented by the first node is used as an input to the operation represented by the second node.

In some implementations, the operations represented in the computational graph are linear algebraic operations, e.g., matrix multiply, neural network operations, or operations for a different kind of machine learning model. A neural network is a machine learning model that employs one or more layers of nonlinear units to predict an output for a received input. Some neural networks are deep neural networks that include one or more hidden layers in addition to an output layer. The output layer of each hidden layer is used as input to another layer in the network, i.e., another hidden layer, the output layer, or both. Some layers of the network generate an output from a received input in accordance with a current value of a respective set of parameters, while other layers of the network may not have parameters.

The operations represented by the computational graph may be operations necessary for the neural network to compute an inference, i.e., to process an input through the layers of the neural network to generate a neural network output for the input. Additionally or alternatively, the operations represented by the computational graph may be operations necessary to train the neural network by performing a neural network training procedure to adjust the values of the parameters of the neural network, e.g., to determine trained values of parameters from initial values of the parameters using backpropagation. In some cases, e.g., during training of the neural network, the operations represented by the computational graph can include operations performed by multiple replicas of the neural network.

By way of illustration, a neural network layer that receives an input from a previous layer can use a parameter matrix to perform a matrix multiplication between the parameter matrix and the input. In some cases, the matrix multiplication can be represented as multiple nodes in the computational graph. For example, a matrix multiplication can be divided into multiple multiplication and addition operations, and each operation can be represented by a different node in the computational graph. The operation represented by each node can generate a respective output, which flows on a directed edge to a subsequent node. After the operation represented by a final node generates a result of the matrix multiplication, the result flows, on a directed edge, to another node. The result is equivalent to an output of the neural network layer that performs the matrix multiplication.

In some other cases, the matrix multiplication is represented as one node in the graph. The operations represented by the node can receive, as inputs, an input tensor on a first directed edge and a weight tensor, e.g., a parameter matrix, on a second directed edge. The node can process, e.g., perform a matrix multiplication of, the input and weight tensors to output, on a third directed edge, an output tensor, which is equivalent to an output of the neural network layer.

Other neural network operations that may be represented by nodes in the computational graph include other mathematical operations, e.g., subtraction, division, and gradient computations; array operations, e.g., concatenate, splice, split, or rank; and neural network building block operations, e.g., SoftMax, Sigmoid, rectified linear unit (ReLU), or convolutions.

In an example system, one or more sets of nodes in the computational graph may represent operations that control the dataflow through a computational graph. The one or more sets of nodes may, for instance, represent conditional, recursive, and/or iterative control flow statements including: if statements, while loops, do-while loops, for loops for-each loops, or nested control flow statements that include a combination of these statements.

The one or more sets of nodes in the computational graph may represent some operations that can translate into operations of high performance libraries which contain high performance implementations of linear algebraic, e.g., matrix multiply, or neural network operations, e.g., backward convolution.

In an example compilation system, the compilation system fuses multiple operations, into a fusion operation that can be translated into a call at code generation time that performs all the fused operations. This fusion process produces efficient code for devices such as CPUs or GPUs.

The computational graph system 100 includes a compiler 103 and a data entity generator 105. The compiler 103 can translate the computational graph of operations to produce machine code that, when executed by one or more devices, causes the devices to perform the operations represented by the computational graph. In some implementations, a machine can include one or more devices, e.g., GPUs and CPUs. A GPU can be controlled by a host CPU. The GPU receives various requests from the host program operated by the host CPU. For example, the GPU can receive requests for launching single data-parallel subroutines at a time, for marking points of interests in a sequence of launches, or for allocating or deallocating GPU memory that is a dedicated memory on the GPU device.

In particular, when the device on which a computational graph is to be executed is a GPU, the compiler 103 generates compilation artifacts for processing the computational graph on a GPU. The compilation artifacts include all descriptions necessary to execute the operations represented by the nodes of the computational graph. In some implementations, the compilation artifacts include machine code, a data structure, buffer data, and library data.

The machine code is generated to process the computational graph. For example, the machine code can be generated for the nodes of the computational graph, a sequence of the operations in the computational graph, and array sizes of the operations in the computational graph. Since this machine code is generated for a particular computational graph, the machine code does not need to account for all possible array sizes of operations. Thus, the machine code can improve the processing speed. The machine code is used for the GPU to process the computational graph. For example, the GPU can execute particular operations represented by the computational graph using the machine code. In some implementations, the machine code may not include code for a CPU. Even if the machine code does not include code for a CPU, the GPU can execute the operations by invoking a data entity. The details of the data entity will be described in greater detail below with reference to FIG. 1B.

In some implementations, the compilation artifacts include the data structure. In some implementations, the data structure can be a DAG. The data structure may represent (i) a sequence of the operations represented by the nodes of the computational graph and (ii) dependencies between the operations.

In some implementations, the compilation artifacts include buffer data. The buffer data specifies which operation is executed on which buffer when the GPU processes the computational graph by executing the operations represented by the computational graph. The buffer data represents buffer parameters and associations between the buffer parameters and the operations. In some implementations, the buffer parameters can be logical numbers. For example, a respective logical number can be assigned to each buffer and a particular operation can be operated on a particular buffer by specifying the logical number assigned to the particular buffer.

In some implementations, the compilation artifacts include library data. The library data represents which GPU library should be called for a particular operation. In some implementations, the library data can also represent which buffer is used for which GPU library. Like the buffer data, respective logical numbers can be assigned to each library and a particular GPU library can be called for a particular buffer by specifying the logical number assigned to the particular buffer.

The data entry generator 105 generates a data entity from the compilation artifacts. The data entity may include all descriptions necessary to execute the operations represented by the nodes of the computational graph. For example, all the compilation artifacts described above can be bundled together to form the data entity. As a result, the data entity includes the machine code, the data structure, e.g., DAG, the buffer data, and the library data. In some implementations, characteristics of the machine code, the data structure, the buffer data, and the library data in the compilation artifacts can be preserved in the data entry. For example, dependencies between the operations in the compilation artifacts can be preserved in the data entry. In some implementations, the data entry can be loaded into a memory of a machine.

The computational graph system 100 provides the data entity to one of machines 160-166 over a data communication network 114. Examples of machines 160-166 may include a computing device, a personal computer, a mobile device, and a server. Each machine may, for example, include one or more devices 120-126, such as a GPU and a CPU. Referring to FIG. 1A, the machines 160-166 respectively include devices 120-126, e.g., GPUs. Since the data entity includes all the descriptions necessary to execute the operations, the machine that receives the data entity can cause a device, e.g., a GPU, to process the computational graph using the data entity. When the data entity is invoked, the device, e.g., a GPU, processes the computational graph by executing the operations represented by the nodes of the computational graph and generate an output. The machine including the device can return the output to the computational graph system 100, which can return the requested output to the client 102. In some implementations, the network 114 can be local area network (LAN) or wide area network (WAN). In some implementations, the machines 160-166 can additionally include a memory, e.g., a random access memory (RAM), for storing instructions and data and a processor for executing stored instructions. Generally, each machine is a hardware resource that performs operations independent of other machines.

Figure 1B:
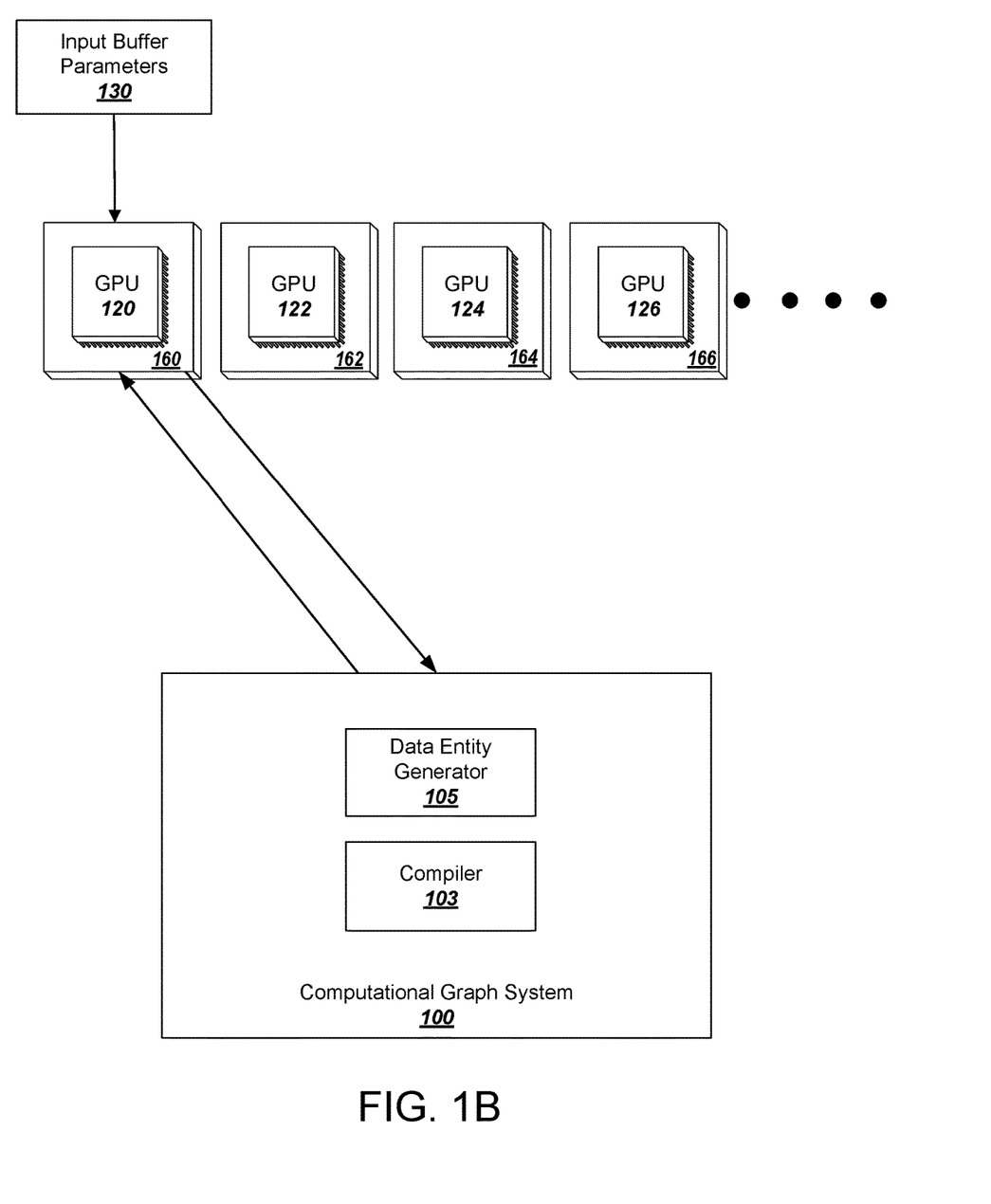
FIG. 1B illustrates example machines for processing a computational graph.

FIG. 1B illustrates example machines 160-166 and example devices 120-126 for processing a computational graph. In FIG. 1B, the machines 160-166 respectively include the devices 120-126, e.g., GPUs. The machine 160 receives input buffer parameters 130. The input buffer parameters 130 are user-specific inputs to a computational graph. In addition, the machines 160-166 can receive the data entity from the computational graph system 100. In this example, the machine 160 that includes the device 120 receives the data entity from the computational graph system 100. The machine 160 invokes the data entity with the input buffer parameters and causes the device 120 to process the computational graph. Since the data entity is generated from the compilation artifacts including buffer data, the data entity includes the buffer data. The data entity includes the input buffer parameters and associations between the input buffer parameters and the operations. Thus, the operations from the computational graph can be identified based on the input buffer parameters. The operations are enqueued on the device 120 as a whole. When the operations are enqueued on the device 120, the device 120 processes the computational graph by executing the enqueued operations and generates an output. The machine 160 return the output to the computational graph system 100, which can return the output to the client 102.

In some implementations, multiple machines 160-166 can respectively receive the input buffer parameters 130 and the data entity. In this example, the operations are enqueued into each of the devices 120-126 and the devices 120-126 can simultaneously process the computational graph by executing the operations. The devices 120-126 generates respective outputs and the machines 160-166 return the outputs to the computational graph system 100.

Figure 2:
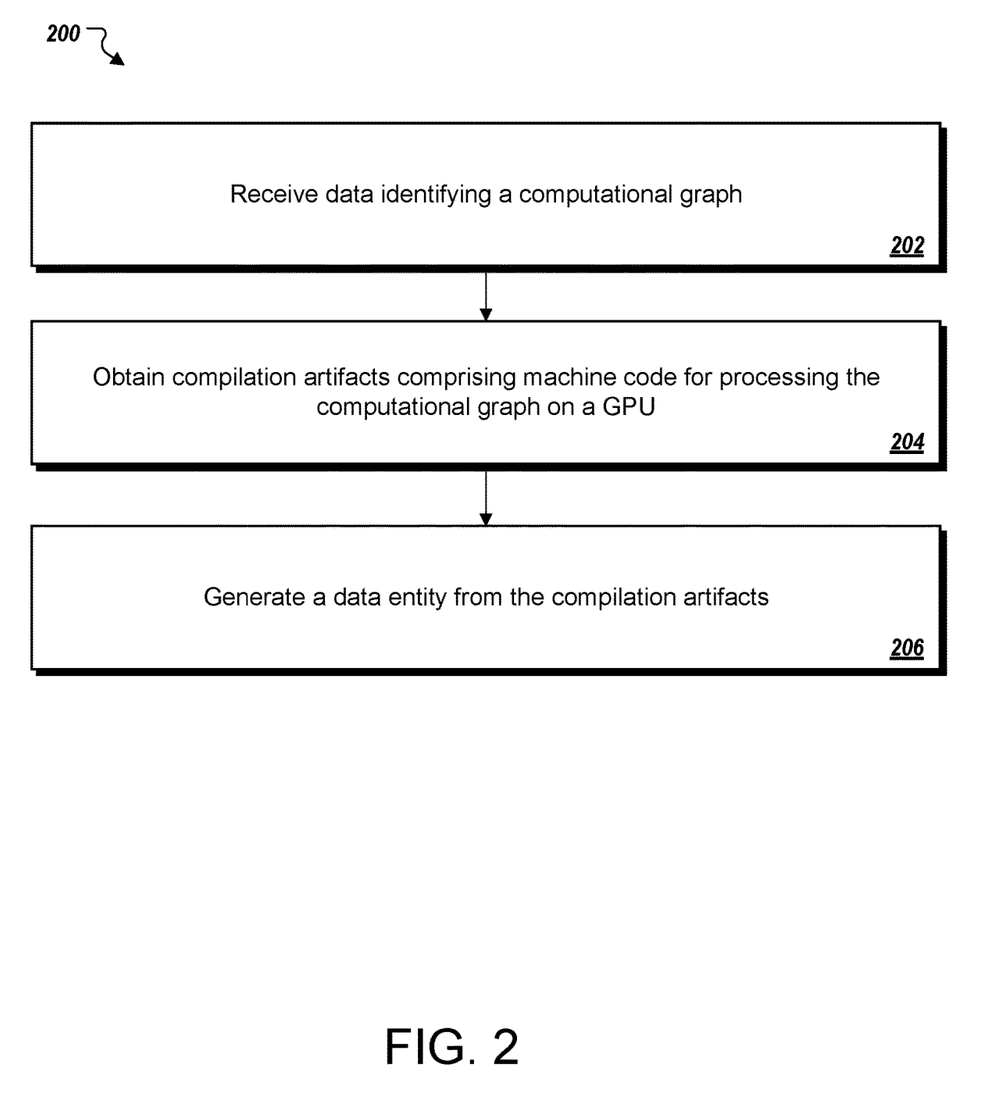
FIG. 2 is a flow chart of an example process for generating a data entity from a computational graph.

FIG. 2 is an example flow chart for generating a data entity from a computational graph.

For convenience, the process 200 will be described as being performed by a system of one or more computers, located in one or more locations, and programmed appropriately in accordance with this specification. For example, an example computational graph system 100 of FIG. 1A, appropriately programmed, can perform the process 200.

The system receives data identifying a computational graph (202). The computational graph may include nodes representing operations.

The system obtains compilation artifacts for processing the computational graph on a GPU (204). The compilation artifacts are generated by a complier that compiles the computational graph for processing by the GPU. The compilation artifacts include descriptions necessary to execute the operations represented by the nodes of the computational graph. For example, the compilation artifacts include machine code, a data structure representing multiple sequences of operations and dependencies between the operations, buffer data, and library data.

The system generates a data entity from the compilation artifacts (206). When the data entity is invoked, the data entity causes the GPU to process the computational graph by executing the operations represented by the plurality of nodes. The data entity may include all descriptions necessary to execute the operations represented by the nodes of the computational graph. For example, all the compilation artifacts described above can be bundled together to form the data entity. As a result, the data entity includes the machine code, the data structure, e.g., DAG, the buffer data, and the library data to cause the GPU to process the computational graph by executing the operations. In some implementations, characteristics of the machine code, the data structure, the buffer data, and the library data in the compilation artifacts can be preserved in the data entry. For example, dependencies between the operations in the compilation artifacts can be preserved in the data entry. In some implementations, the data entry can be loaded into a memory of a machine.

Figure 3:
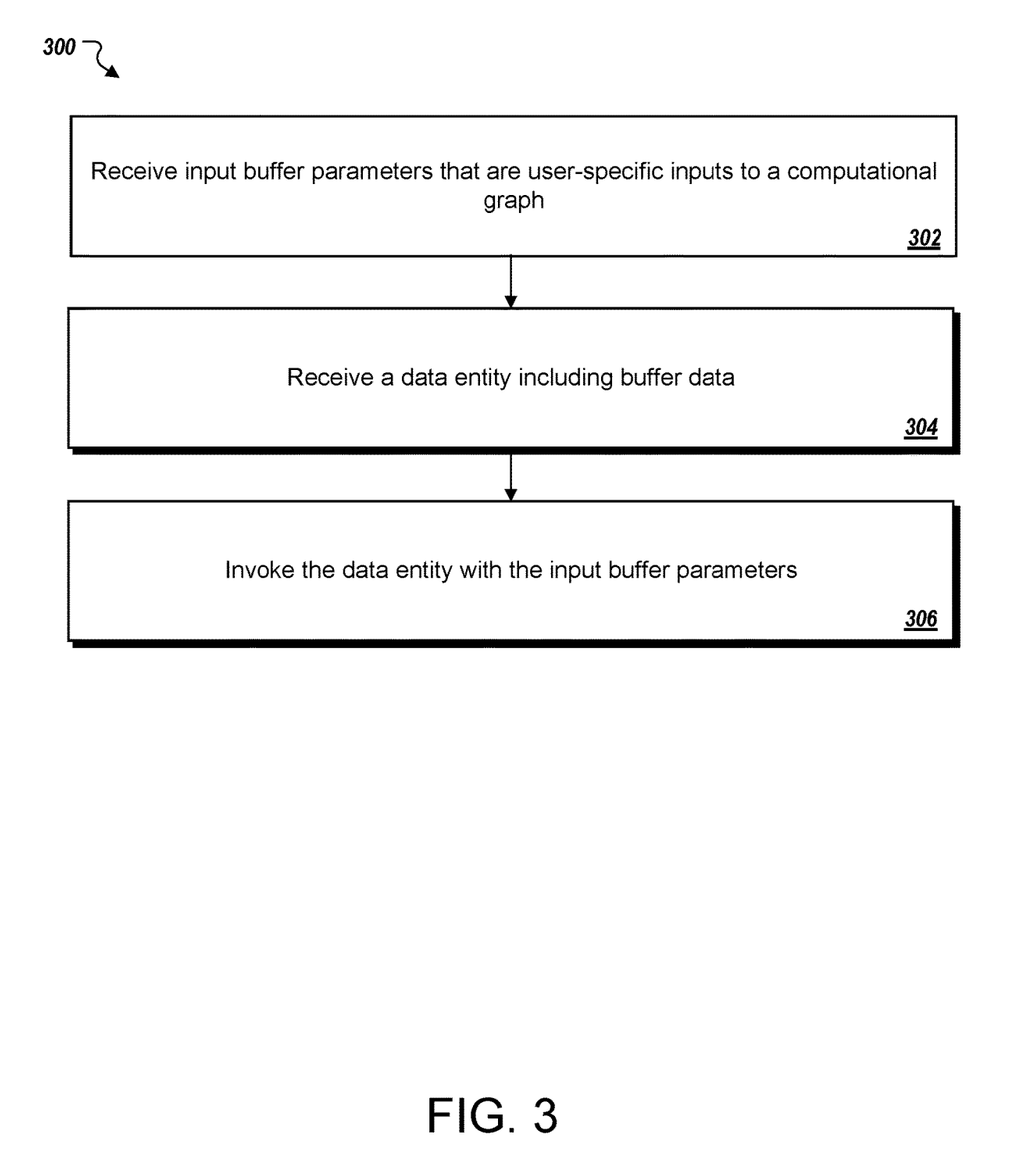
FIG. 3 is a flow chart of an example process for invoking a data entity to process a computational graph by executing operations represented by the computational graph.

FIG. 3 is an example flow chart for invoking a data entity to process a computational graph by executing operations represented by the computational graph. For convenience, the process 300 will be described as being performed by one or more GPUs. For example, example machines 160-166 of FIG. 1B, appropriately programmed, can perform the process 300.

The machine receives input buffer parameters (302). The machine can include one or more devices such as a GPU and a CPU. The input buffer parameters are user-specific inputs to a computational graph. In some implementations, the machine can receive the input buffer parameters from a user. The computational graph includes a plurality of nodes representing operations.

The machine receives a data entity (304). The data entity may include buffer data representing (i) a plurality of buffer parameters including the input buffer parameters and (ii) associations between the plurality of buffer parameters and the operations. In some implementations, the machine can receive the data entity from a computational graph system.

The machine invokes the data entity with the input buffer parameters (306). When the data entity is invoked, the data entity causes a device, e.g., a GPU, to process the computational graph in accordance with the input buffer parameters by executing the operations. In some implementations, operations from the computational graph corresponding to the input parameter buffers can be identified based on the data entity. The machine enqueues the identified operations as a whole into the device to process the computational graph.

Figure 4:
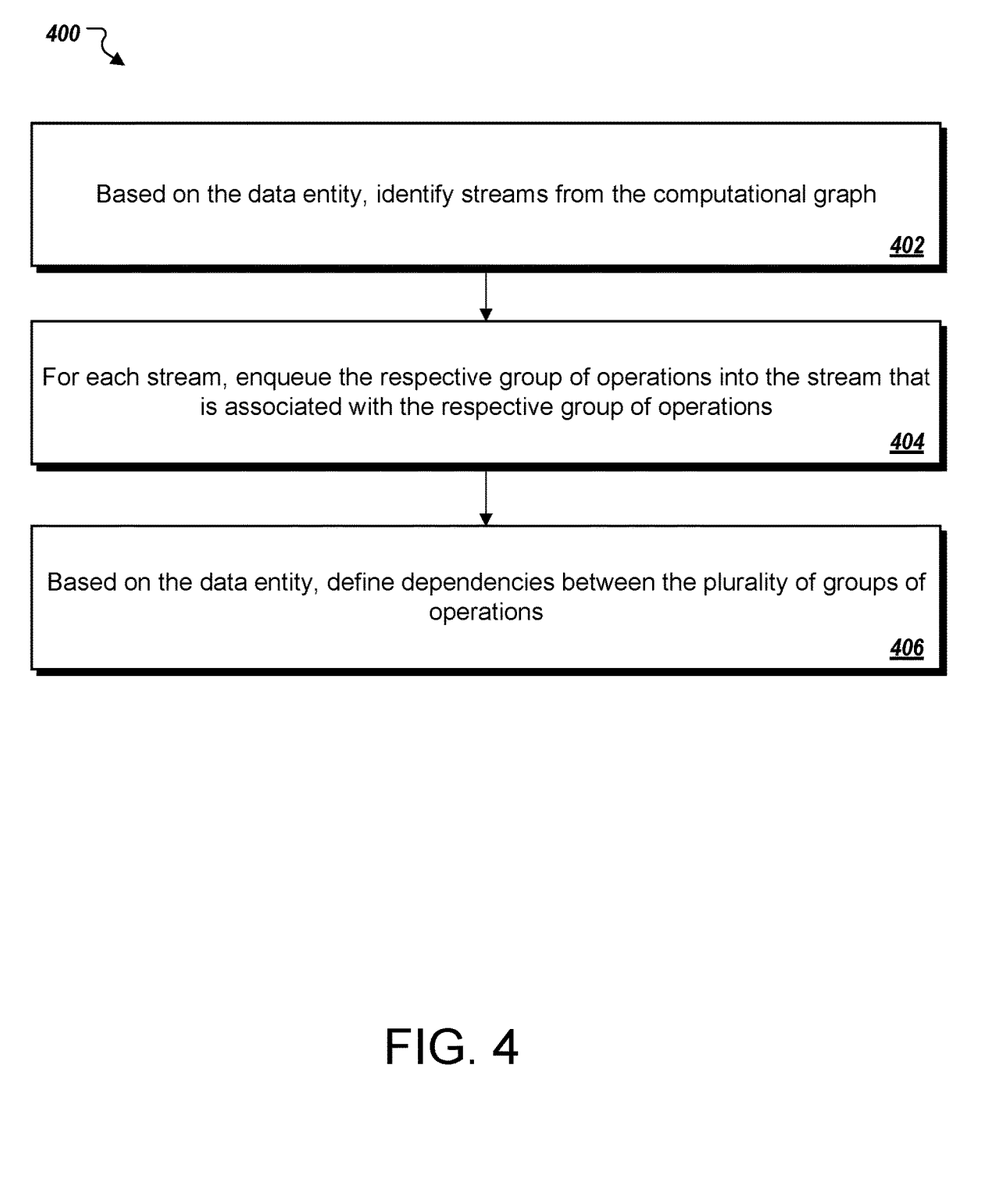
FIG. 4 is a flow chart of an example process for invoking a data entity to process a computational graph by executing operations represented by the computational graph.

FIG. 4 is an example flow chart for invoking a data entity to process a computational graph by executing operations represented by the computational graph. For convenience, the process 400 will be described as being performed by one or more GPUs. For example, example machines 160-166 of FIG. 1B, appropriately programmed, can perform the process 400. The machines can include one or more devices such as a GPU and a CPU. In this example, the operations include multiple groups of operations and the data entity includes a data structure representing (i) streams and (ii) dependencies between the operations in the streams.

The machine, based on the data entity, identifies streams from the computational graph (402). Each stream can be associated with a respective group of operations from the operations.

The machine, for each stream, enqueues the respective group of operations into the stream that is associated with the respective group of operations (404). For each stream, the machine can identify the respective group of operations based on the date entity. Once the machine identifies the respective groups of operations for the streams, the machine enqueues the respective group of operations into each stream.

The machine, based on the data entity, defines dependencies between the plurality of groups of operations (406). The data entity includes the data structure representing dependencies between the operations. From the dependencies between the operations, dependencies between the plurality of groups of operations can be determined. In some implementations, dependencies from all of the streams can be made to a particular stream. This particular stream can be defined as a primary stream.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for compiling machine code for one or more processing units that are controlled by a processor, the method comprising:
    receiving a computational graph and input buffer parameters, wherein the computational graph comprises a plurality of nodes representing respective operations;
    generating compilation artifacts, wherein the compilation artifacts include the machine code for execution by the one or more processing units to execute the respective operations represented by the plurality of nodes in the computational graph, wherein the compilation artifacts include the input buffer parameters, and wherein the compilation artifacts exclude any machine code for execution by the processor;
    generating, from the compilation artifacts, a data entity that, when invoked at run time by the one or more processing units, causes the one or more processing units to process the computational graph in accordance with the input buffer parameters and without executing any machine code by the processor, the processing by the one or more processing units comprising:
        enqueuing the respective operations into the one or more processing units,
        based on the data entity, defining dependencies between the respective operations, and
        executing the respective enqueued operations by the one or more processing units according to the dependencies and without executing any machine code by the processor.

2. The method of claim 1, wherein the one or more processing units comprise a graphics processing unit (GPU) and the processor comprises a central processing unit (CPU).

3. The method of claim 1, wherein the data entity includes machine code that, when executed by the one or more processing units, cause the one or more processing units to invoke the data entity to process the computational graph in accordance with the input buffer parameters and without awaiting the instruction data from the processor.

4. The method of claim 1, wherein the respective operations are enqueued according to a particular order; and the processing comprises:
    generating instructions that when executed by the one or more processing units cause the one or more processing units to execute the respective operations according to the particular order.

5. The method of claim 4, wherein enqueuing the respective operations into the one or more processing units, comprises:
    generating instructions that when executed by the one or more processing units cause the one or more processing units to enqueue, at each processing unit in the one or more processing units, a respective subset of the respective operations; and
    generating instructions that when executed by the one or more processing units cause the one or more processing units to, at each processing unit, execute the respective subset of the respective operations for the processing unit.

6. The method of claim 1, wherein each processing unit of the one or more processing units comprises a respective buffer, and the method further comprises:
    assigning, by the one or more processing units, a first operation of the respective operations to a buffer of a particular processing unit of the one or more processing units for execution based on buffer data.

7. The method of claim 1, wherein the input buffer parameters comprise:
    a plurality of buffer parameters including the input buffer parameters and associations between the plurality of buffer parameters and the respective operations, each of the plurality of buffer parameters being associated with a respective operation of the respective operations.

8. The method of claim 1, wherein the compilation artifacts comprise:
    a data structure representing (i) a sequence of operations corresponding to the respective operations represented by the computational graph, and (ii) dependencies between the respective operations.

9. The method of claim 1, wherein the compilation artifacts comprise:
    library data representing a plurality of buffer parameters and associations between the plurality of buffer parameters and a plurality of libraries comprising one or more sub-routines, each of the plurality of buffer parameters associated with a respective library of the plurality of libraries.

10. The method of claim 1, wherein the respective operations are operations for processing an input of a neural network through one or more layers of the neural network to generate an output of the neural network.

11. A system comprising:
one or more computers and one or more storage devices on which are stored instructions that are operable, when executed by the one or more computers, to cause the one or more computers to perform first operations for compiling machine code for one or more processing units, comprising:
receiving a computational graph and input buffer parameters, wherein the computational graph comprises a plurality of nodes representing respective operations;
generating compilation artifacts, wherein the compilation artifacts include the machine code for execution by the one or more processing units to execute the respective operations represented by the plurality of nodes in the computational graph, wherein the compilation artifacts include the input buffer parameters, and wherein the compilation artifacts exclude any machine code for execution by a processor, the processor configured to control the one or more processing units;
generating, from the compilation artifacts, a data entity that when invoked at run time by the one or more processing units, causes the one or more processing units to process the computational graph in accordance with the input buffer parameters and without executing any machine code by the processor, the processing by the one or more processing units comprising:
enqueuing the respective operations into the one or more processing units,
based on the data entity, defining dependencies between the respective operations, and
executing the respective enqueued operations by the one or more processing units according to the dependencies and without executing any machine code by the processor.

12. The system of claim 11, wherein the one or more processing units comprise a graphics processing unit (GPU) and the processor comprises a central processing unit (CPU).

13. The system of claim 11, wherein the data entity includes machine code that, when executed by the one or more processing units, causes the one or more processing units to invoke the data entity to process the computational graph in accordance with the input buffer parameters and without awaiting the instruction data from the processor.

14. The system of claim 11, wherein the respective operations are enqueued according to a particular order; and the processing further comprises:
generating instructions that when executed by the one or more processing units causes the one or more processing units to execute the respective operations according to the particular order.

15. The system of claim 14, wherein enqueuing the respective operations into the one or more processing units, comprises:
generating instructions that when executed by the one or more processing units causes the one or more processing units to enqueue, at each processing unit in the one or more processing units, a respective subset of the respective operations; and
generating instructions that when executed by the one or more processing units causes the one or more processing units to, at each processing unit, execute the respective subset of the respective operations for the processing unit.

16. The system of claim 11, wherein each processing unit of the one or more processing units comprises a respective buffer, and the first operations further comprising:
assigning, by the one or more processing units, a first second operation of the respective operations to a buffer of a particular processing unit of the one or more processing units for execution based on buffer data.

17. The system of claim 11, wherein the input buffer parameters comprise:
a plurality of buffer parameters including the input buffer parameters and associations between the plurality of buffer parameters and the respective operations, each of the plurality of buffer parameters being associated with a respective second operation of the respective operations.

18. The system of claim 11, wherein the compilation artifacts comprise:
library data representing a plurality of buffer parameters and associations between the plurality of buffer parameters and a plurality of libraries comprising one or more sub-routines, each of the plurality of buffer parameters associated with a respective library of the plurality of libraries.

19. The system of claim 11, wherein the respective operations are operations for processing an input of a neural network through one or more layers of the neural network to generate an output of the neural network.

20. One or more non-transitory computer-readable storage media encoded with instructions that, when executed by one or more computers, cause the one or more computers to perform first operations for compiling machine code for one or more processing units, the first operations comprising:
receiving a computational graph and input buffer parameters, wherein the computational graph comprises a plurality of nodes representing respective operations;
generating compilation artifacts, wherein the compilation artifacts include the machine code for execution by the one or more processing units to execute the respective operations represented by the plurality of nodes in the computational graph, wherein the compilation artifacts include the input buffer parameters, and wherein the compilation artifacts exclude any machine code for execution by a processor, the processor configured to control the one or more processing units;
generating, from the compilation artifacts, a data entity that when invoked at run time by the one or more processing units, causes the one or more processing units to process the computational graph in accordance with the input buffer parameters by executing the respective operations and without executing any machine code by the processor, the processing by the one or more processing units comprising:
enqueuing the respective operations into the one or more processing units,
based on the data entity, defining dependencies between the respective operations, and
executing the respective enqueued operations by the one or more processing units according to the dependencies and without executing any machine code by the processor.

* * * * *